No. 804,991. PATENTED NOV. 21, 1905.
J. W. ALKIRE & J. ORNDORFF.
FEED TROUGH.
APPLICATION FILED MAY 31, 1905.
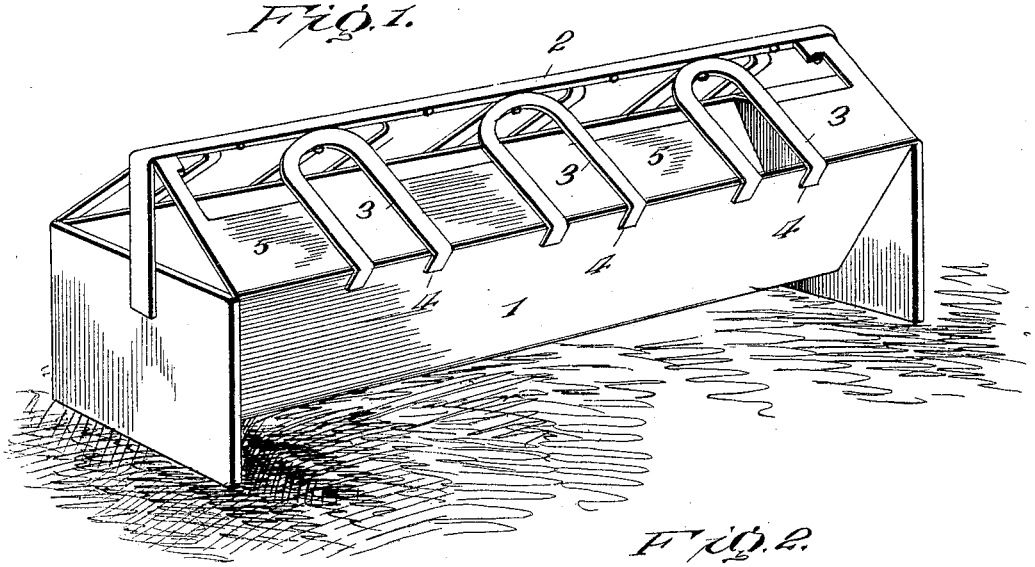
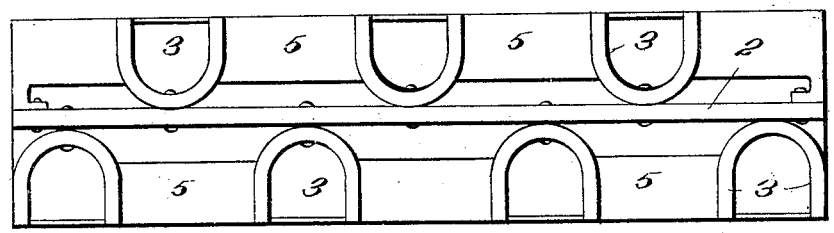
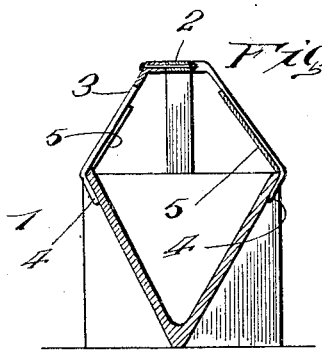
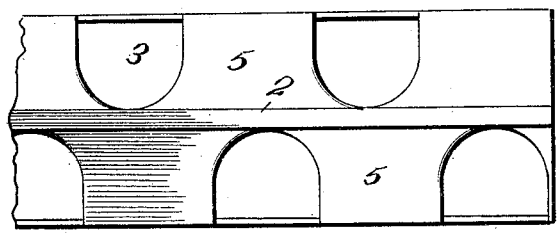
Inventors
John W. Alkire,
Jacob Orndorff,
Witnesses

UNITED STATES PATENT OFFICE.

JOHN W. ALKIRE AND JACOB ORNDORFF, OF WICHITA, KANSAS.

FEED-TROUGH.

No. 804,991.  Specification of Letters Patent.  Patented Nov. 21, 1905.

Application filed May 31, 1905. Serial No. 263,120.

*To all whom it may concern:*

Be it known that we, JOHN W. ALKIRE and JACOB ORNDORFF, citizens of the United States, residing at Wichita, in the county of Sedgwick and State of Kansas, have invented certain new and useful Improvements in Feed-Troughs, of which the following is a specification.

This invention relates to an attachment for troughs used in feeding live stock, and is so designed as to allow animals to have ready access for eating or drinking purposes, but to prevent their contaminating the contents of the trough by sticking their feet therein or getting into it bodily.

A further object is to produce a device of this character which can be easily and quickly attached to any trough and which will very materially add to the good health of the animals by always supplying them with pure water and food.

For a full description of the invention and the merits thereof and also to acquire a knowledge of the details of construction of the means for effecting the result reference is to be had to the following description and accompanying drawings, in which—

Figure 1 is a perspective view of the device. Fig. 2 is a top plan view. Fig. 3 is a transverse sectional view. Fig. 4 is a top plan view showing a modification.

Corresponding and like parts are referred to in the following description and indicated in all the views of the drawings by the same reference characters.

The numeral 1 designates a trough of ordinary construction, and 2 a longitudinal bar located thereover and having its ends bent downward to engage the ends of the trough. Bars 3 are bent so as to form approximately U-shaped members and are secured at about their center point on each side of the longitudinal bar 3 by bolts or other suitable means. The ends of the U-shaped members are bent inward at 4, so as to engage the sides of the trough and hold the device in position. Plates 5, which serve as guard members, are located between the adjacent U-shaped members and are secured thereto by rivets or other suitable means. These plates 5 rest against the sides of the trough and may extend entirely up to the longitudinal bar 2, as seen in Fig. 4, or only a part of the way up, as may be desired. It will be observed that the openings on one side of the trough are opposite the plates on the other side of the trough, so that the animals can have access to the contents of the trough from either side without interfering with each other.

By the use of our device it will be readily understood that while the animals can readily avail themselves of the contents of the trough for eating or drinking purposes they are effectively prevented from sticking their feet therein. The plates 5 also serve as guard members and to a very great extent prevent dirt from being thrown into the trough.

The use of our device produces a great saving in the quantity of food used and is also very conducive to the health of the animals, inasmuch as it always guarantees a supply of pure food and water.

Having thus described the invention, what is claimed as new is—

1. A trough provided with guard members which extend upwardly from the sides thereof and converge toward each other, said guard members having portions cut away to form spaces through which access may be had to the contents of the trough, and connecting means between the upper portions of the guard members.

2. In a device of the character described the combination of a longitudinal member adapted to be placed over the trough, transverse members secured to the longitudinal member and extending downward on each side to the sides of the trough, and plates secured between the transverse members to form alternate open and closed spaces.

3. In a device of the character described the combination of a longitudinal member located over the trough, bars secured at approximately their center point on each side of the longitudinal member and having their arms bent so as to engage the sides of the trough, and plates secured between the arms of the adjacent bars so as to form alternate open and closed spaces.

In testimony whereof we affix our signatures in presence of two witnesses.

JOHN W. ALKIRE. [L. S.]
JACOB ORNDORFF. [L. S.]

Witnesses:
R. L. HOLMES,
G. C. WHITLOCK.